United States Patent [19]

Lavan, Jr. et al.

[11] Patent Number: 5,729,134
[45] Date of Patent: Mar. 17, 1998

[54] APPARATUS FOR DETECTING UNDERWATER MAGNETIC SOURCES WITH IMPULSE SIGNALING

[75] Inventors: Charles K. Lavan, Jr., Medina; Susan E. Hall, Wadsworth, both of Ohio

[73] Assignee: Lockheed Martin Tactical Defense Systems, Inc., Akron, Ohio

[21] Appl. No.: 523,293

[22] Filed: Sep. 5, 1995

[51] Int. Cl.$^6$ .............................. G01N 27/72; G01R 33/12
[52] U.S. Cl. .............................................. 324/239; 324/262
[58] Field of Search ...................... 324/239, 228, 324/234, 243, 262, 323, 326, 329, 330, 331, 334, 336, 337; 102/417, 427, 212

[56] References Cited

U.S. PATENT DOCUMENTS

| 4,218,975 | 8/1980 | Ream | 324/239 |
| 4,849,699 | 7/1989 | Gill et al. | 324/339 |

*Primary Examiner*—Walter E. Snow
*Attorney, Agent, or Firm*—Renner, Kenner, Greive, Bobak, Taylor & Weber

[57] ABSTRACT

A magnetic influence system for underwater systems has a low-inductance source coil for generating an impulsive magnetic dipole field in the vicinity of the underwater system. A high-voltage power source provides a transient voltage pulse to the source coil, resulting in a rapid current pulse rise time in the source coil. The impulse source coil is mounted on a non-conductive hull section of the underwater system. A plurality of impulse sensor coils are also distributed on the system hull at the null points of the magnetic dipole field and detect the returning scattered signal generated by the impulse source coil.

17 Claims, 3 Drawing Sheets

| CHARACTERISTIC | SINGLE FREQUENCY SIGNAL | WIDE BANDWIDTH SIGNAL |
|---|---|---|
| Typical Signal | Continuous Wave Sinusoid | Rapid Use Time Transient |
| Time Domain Waveform | $\cos(\omega_0 t)$ | $e^{-\alpha t}v(t)$ |
| Frequency Domain Representation | $\pi[\delta(\omega+\omega_0)+\delta(\omega-\omega_0)]$ at $\pm\omega_0$ | $\dfrac{1}{\alpha+j\omega}$ |
| Bandwidth | Narrow | Broadband |
| Information Content | LOW: Indication of field disturbance | HIGH: Frequency-rich signal provides much information on the targets |
| Field Pattern | (multi-lobe pattern at 0°) | (single lobe pattern at 0°) |
| Relative Bandwidth | $(f_H - f_L)/(f_H + f_L) \rightarrow 0$ | $(f_H - f_L)/(f_H + f_L) \rightarrow 1$ |
| Harmonic Characteristics | SINUSOIDAL | NON-SINUSOIDAL |

FIG.-4

APPARATUS FOR DETECTING UNDERWATER MAGNETIC SOURCES WITH IMPULSE SIGNALING

TECHNICAL FIELD

The invention herein resides in the art of magnetic influence systems. More particularly, the invention relates to underwater magnetic influence systems such as those used for underwater communications, buried ordnance detection, target discrimination, target classification, weapon guidance and warhead fuzing. Specifically, the invention relates to a magnetic influence source and sensor for such systems, using impulsive transient signals to generate a magnetic field and receive a returning scattered signal.

BACKGROUND ART

Heretofore, it has been known to use acoustic systems for underwater communication, buried ordnance detection, target discrimination, target classification and weapon guidance. However, in recent years, underwater countermeasures have become significantly more capable in their ability to jam or otherwise interfere with such systems. If the only effect of a countermeasure is to cause a torpedo to attack and circle the device for investigation, then the likelihood of escape for the targeted threat vehicle has been significantly enhanced. Underwater countermeasures are typically acoustic devices which deliver large amounts of acoustic energy into the water. Acoustic countermeasures, such as static jammers and mobile devices provide discrete tonal, echo repeat, doppler shift, and other various levels of acoustic sophistication. Such countermeasures may be threat-deployed or own-ship deployed. Accordingly, it is most desirable to obtain underwater communication and detection systems which are hardened to such acoustic countermeasures.

It is also known to use magnetic influence systems in underwater weapon systems for warhead fuzing. The coupled source-sensor technology presently employed in such weapon systems for warhead fuzing is actually an example of classical transformer theory. The source coil/inductor is an element of a resonant circuit which provides a time-varying, harmonic, magnetic dipole field in the vicinity of the torpedo. The L-C circuit establishes the resonant frequency. Analysis and mapping of the dipole field allows the placement of sensor coils at the null points, making it possible to sense disturbances resulting from conductive bodies entering the field. However, the known systems are limited to detection of relatively large disturbances within the effective detection range for seawater established by the resonant frequency. This is due to the size and power requirements for such magnetic influence systems, and explains the utilization of such systems for warhead fuzing applications.

Accordingly, it is also desired to obtain a magnetic influence system having a greater magnetic moment capability for a given power expenditure and/or a reduction in size, weight, and power consumption for a given magnetic moment capability, so as to allow use of magnetic influence technology for underwater communications, buried ordnance detection, target discrimination, target classification, and/or weapon guidance.

DISCLOSURE OF INVENTION

In light of the foregoing, it is an aspect of the invention to provide a magnetic influence system for underwater communications, buried ordnance detection, target discrimination, target classification, and/or weapon guidance and warhead fuzing.

Another aspect of the invention is the provision of a magnetic influence system having greatly-reduced power requirements over previously-known systems.

Yet another aspect of the invention is the provision of a magnetic influence system with increased magnetic moment capability for a given power expenditure over previously-known systems.

Still another aspect of the invention is the provision of a magnetic influence system which uses wide band width, impulsive, transient magnetic field signals, having high peak power and a frequency content tailored to achieve range, bearing, and signature resolution.

The foregoing and other aspects of the invention, which will become apparent as the detailed description proceeds, are achieved by the improvement in a magnetic influence system for an underwater system, the underwater system having a hull, the improvement comprising: impulse source means for generating an impulsive magnetic dipole field in the vicinity of the underwater system; and impulse sensor means for detecting a returning scattered signal generated by the impulse source means.

Other aspects of the invention are attained by a magnetic influence system, comprising: impulse source means for generating an impulsive magnetic dipole field in the vicinity of the source; and impulse sensor means for detecting a returning scattered signal generated by the impulse source means.

Still other aspects of the invention are achieved by a magnetic influence system for an underwater weapon, comprising: a hull having a non-conductive section; a low-inductance magnetic influence source coil for generating an impulsive magnetic dipole field in the vicinity of the weapon; a high-voltage power source adapted to provide a transient voltage pulse to the source coil, resulting in a rapid current pulse rise time in the source coil; and a plurality of magnetic influence sensors distributed on the hull at the null points of the magnetic dipole field for detecting a returning scattered signal generated by the impulse source means.

BRIEF DESCRIPTION OF THE DRAWINGS

For a complete understanding of the objects, techniques, and structure of the invention, reference should be made to the following detailed description and accompanying drawings wherein:

FIG. 4 is a table comparing prior art continuous wave sinusoid-type signals with the impulsive, transient-type signals utilized by the present invention.

BEST MODE FOR CARRYING OUT THE INVENTION

Figure 1:
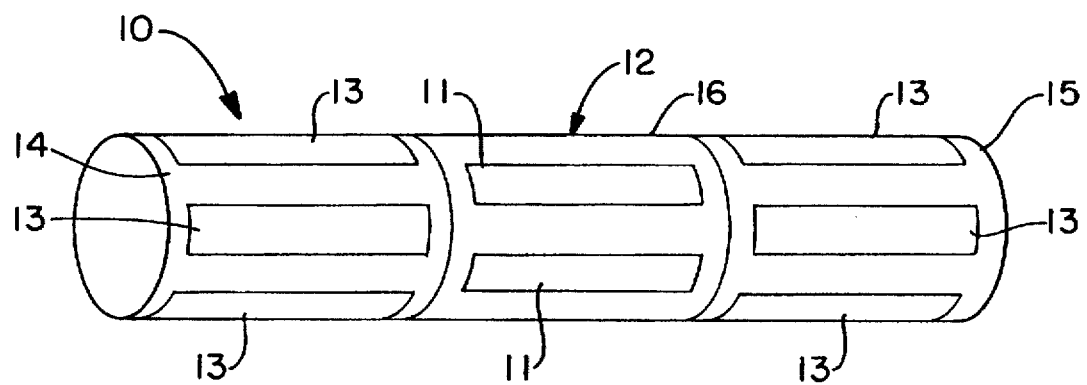
FIG. 1 is a perspective view of a hull section according to the invention.

Referring now to the drawings, and more particularly to FIG. 1, it can be seen that a magnetic influence system according to the invention is designated generally by the numeral 10. As shown, the magnetic influence source coils 11 are located near the midpoint of the hull 12, while the magnetic influence sensor coils 13 are located both at the hull forebody 14 and afterbody 15. However, it should be noted that the locations of the source 11 and sensor 13 coils may vary with the application. It should further be noted that the source coils 11 and sensor 13 coils need not be conventional wire coils 15 but could be any type of suitable component such as fiber optic systems. The term "coil" is used for convenience and is not meant to be limiting. Modeling of the interactions between the source coils and conventional conductive hulls indicates that magnetic influence system power requirements can be significantly reduced by eliminating the conductive hull beneath and around the source coils. Thus, the portion 16 of the hull 12 in the vicinity of the source coils 11 may be fabricated from a non-conductive material such as PVC or filament-wound material. It has been determined that the use of such a non-conductive hull material in the vicinity of the source coils 11 reduces active source power requirements by up to 85%, and sensor sensitivity has been increased by a factor of 1.5. However, the concept of the present invention will work in conjunction with a conductive hull section, provided the source 11 and sensor 13 coils are located on the outer skin of the hull.

Power requirements have also been reduced by utilization of high-voltage transient pulses in the coil circuit. Those skilled in the art will recognize that the magnetic influence source coil provides the transformation relationship between the input voltage/current pulse and the requisite magnetic field pulse shape. This transformation is effected by the coil and core parameters, as well as the output wave form requirements. The use of a transient pulse allows high peak power without generating high losses due to continuous current flow in the coils. Thus, power availability is no longer the primary inhibitor to realization of the capabilities of magnetic influence systems for underwater communication, detection, and weapon guidance.

Selective shaping of the source signal enhances the information content without introducing objectionable effects. It has been found that impulsive-type transient signals can facilitate such signal shaping so as to provide increased information content due to resonant effects and also reduce undesirable effects, such as side lobes.

Figure 2:
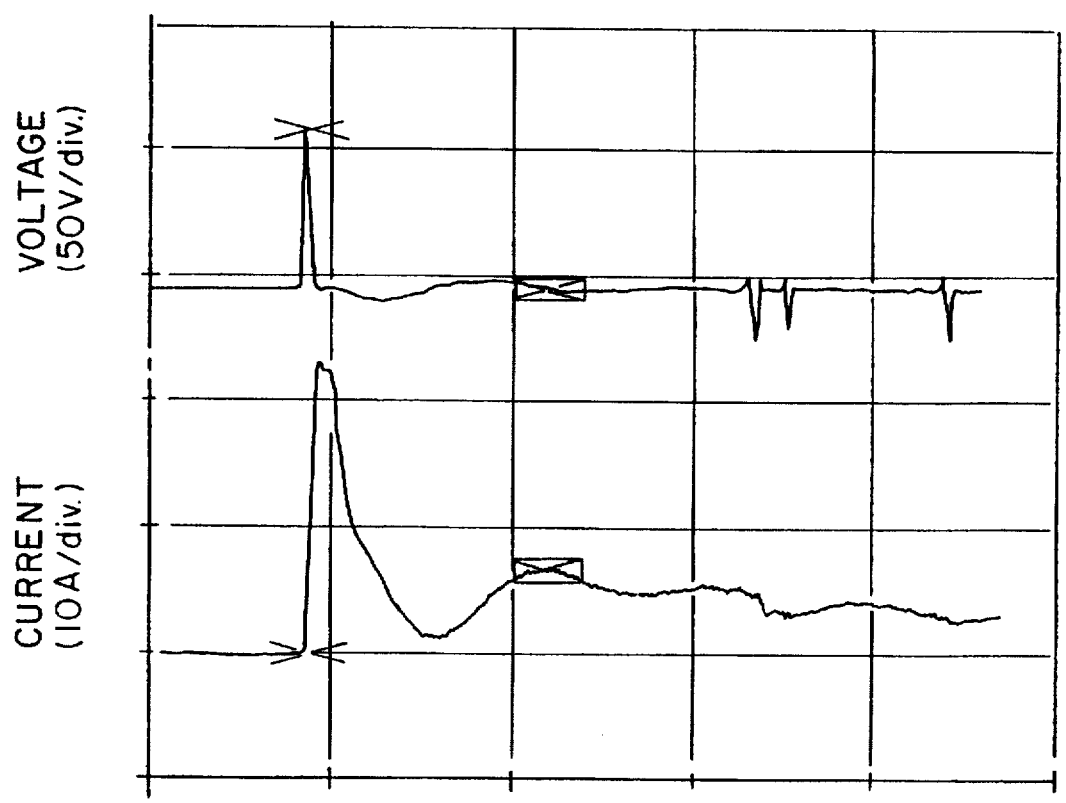
FIG. 2 is a graph showing a transient voltage pulse and the accompanying current response in the source inductor.
Figure 3:
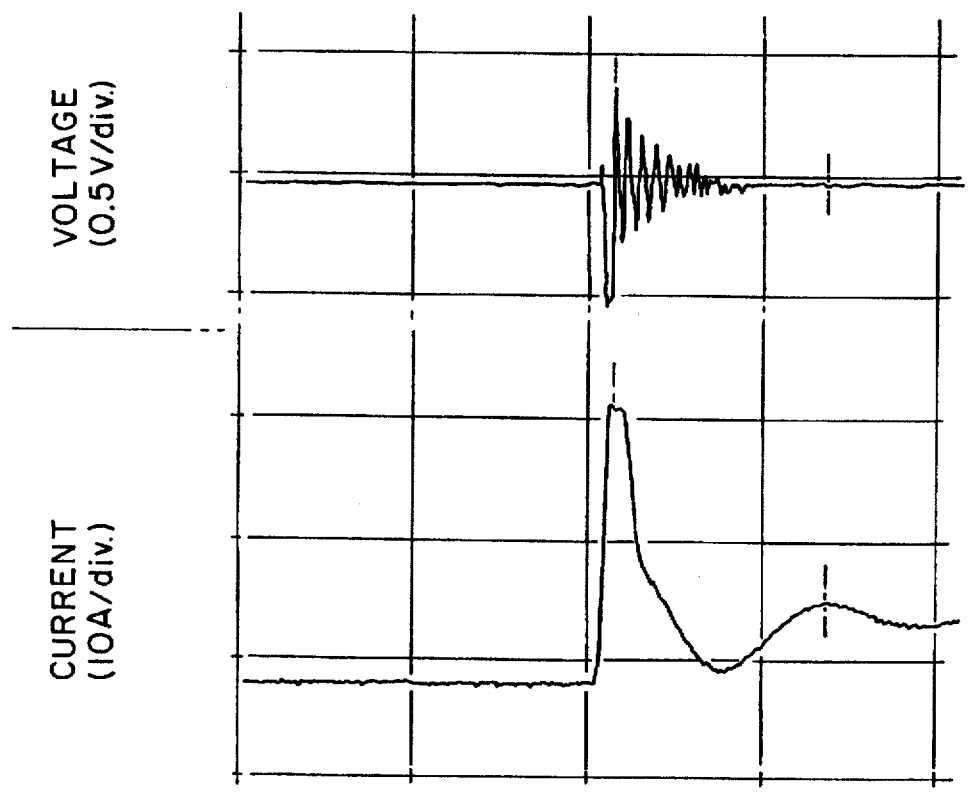
FIG. 3 is a graph showing the corresponding response in the sensor coil to the pulsed current.

For impulsive-type signals, the rise time of the signal should be minimal. The rise time determines the frequency content of the field transient and thus determines the information content of the scattered signal. Rapid rise times may be achieved by varying the parameters of the coil circuit. Specifically, rise time is a function of L/R where R is the coil resistance and L is the coil inductance. With reference to FIG. 2, it can be seen that even with relatively low voltage and high inductance, a significantly rapid rise time may be achieved. Specifically, the pulses shown in FIG. 2 illustrate the voltage and current pulse achieved by using a 45 Vdc power supply with a capacitor across the output. The coil had an inductance of 1567 µH and a resistance of 0.19 ohms. Using these parameters, a rise time on the order of 600 µS was achieved. With reference to FIG. 3, the pulses shown illustrate the current pulse shown in FIG. 2 and the resulting signal detected by a sensor coil located in air approximately two feet from the source. The impulse response of the sensor coil is clearly illustrated by its characteristic resonance. These results indicate that a voltage greater than or equal to 100 Vdc and an inductance less than or equal to 1000 µH would serve to achieve the desired rapid rise time pulse. Such an impulsive transient signal allows broad band transmission with a relative band width approaching 1. With reference to FIG. 4, the advantages of such rapid rise time transient signals become apparent when compared with single frequency continuous wave sinusoid-type signals.

By using electromagnetic field scattering modeling techniques, the scattering signatures for various targets may be analyzed. Thus, the magnetic influence system may provide target discrimination by analyzing the signature of the returning scattered transient signal.

By analyzing and mapping the fields associated with the active source coil, the sensor coils can be located in the field nulls. Further, by distributing the sensors at the forebody 14 and afterbody 15, the time-of-arrival effects over the length of the torpedo hull 12 allow for angular and range resolution. Angular resolution is made possible by the fact that for high-speed transient signals, the magnitude and wave form of the signal vary greatly with angle off-the-source axis. For conventional harmonic systems, magnitude and phase of the wave form vary with angle off axis, but the basic wave form does not vary. In addition, the sensors can also make use of the impulsive nature of the transient field pulse and its scattered return in order to discern azimuth and elevation of the scattering target.

Figure 5:
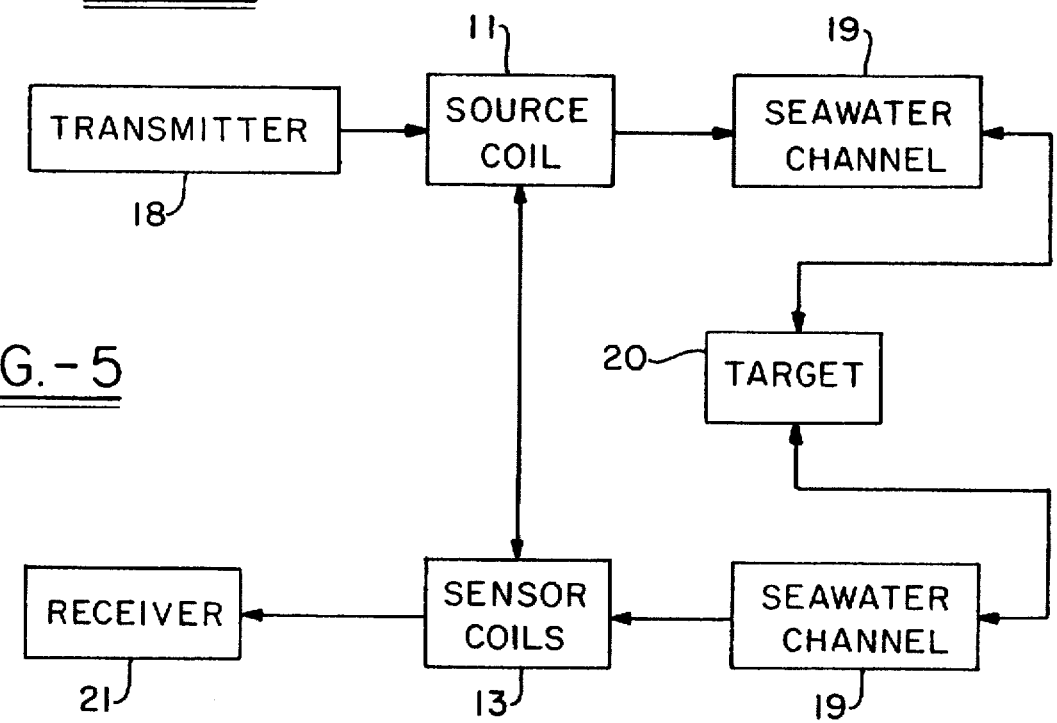
FIG. 5 is a flow chart showing the information/process flow of the present invention.

The information/process flow of the present invention is shown in FIG. 5. The transmitter/power source 18 pulses the source coil 11 at a rate required by the system controller to transmit a broad band transient signal. This signal is conducted through the seawater channel 19 to the target 20 and back through the seawater channel 19 to the sensor coils 13. The receiver 21 and demodulation electronics then analyze the signature of the returning scattered transient signal, so that the system controller may respond accordingly.

Thus, it can be seen that the objects of the invention have been satisfied by the structure presented above. While, in accordance with the patent statutes, only the best mode and preferred embodiment of the invention has been presented and described in detail, it is to be understood that the invention is not limited thereto or thereby. Accordingly, for an appreciation of the true scope and breadth of the invention, reference should be made to the following claims.

What is claimed is:

1. In a magnetic influence system for an underwater system, the underwater system having a hull, comprising:

impulse source means for generating a broad-band impulsive magnetic dipole field in the vicinity of the underwater system; and, impulse sensor means for detecting a returning scattered signal generated by a reflection of said broad-band magnetic dipole field off of a target, wherein said impulse source means is carried by a non-conductive section of a hull and includes a low-inductance source coil and a high-voltage power source, said high-voltage power source adapted to provide a transient voltage pulse to said source coil, resulting in a rapid current pulse rise time in said source coil and wherein said returning scattered signal provides a bandwidth approaching 1, wherein the impulse source means and the impulse sensor means are carried by the hull.

2. The magnetic influence system according to claim 1, wherein said source coil has an inductance of less than 1000 µH.

3. The magnetic influence system according to claim 1, wherein said power source has a voltage greater than 100 Vdc.

4. The magnetic influence system according to claim 1, wherein said rise time of said current pulse in said source coil is less then 600 µS.

5. The magnetic influence system according to claim 1, wherein said impulse sensor means includes a plurality of sensor coils distributed at various locations on the hull.

6. The magnetic influence system according to claim 5, wherein said plurality of sensor coils are located on the hull at the null points of the magnetic dipole field at positions on the hull fore and aft with said impulse source means positioned between fore and aft to facilitate angular and range resolution of the target.

7. The magnetic influence system according to claim 1, wherein the hull has a non-conductive section, and said source coil is located on said non-conductive hull section, whereby coupling between coils, flux attenuation, and eddy currents are eliminated.

8. A magnetic influence system for detecting moving submerged targets comprising:

non-explosive impulse source means for generating an impulsive broad-band magnetic dipole field in the vicinity of the source wherein said impulse source means includes a low-inductance source coil and a high-voltage power source, said high-voltage power source adapted to provide a transient voltage pulse to said source coil, resulting in a rapid current pulse rise time in said source coil; and, impulse sensor means for detecting a returning scattered signal generated by a reflection of said impulsive broad-band magnetic dipole field off of a moving submerged target wherein said impulse sensor means employs said returning scattered signal to determine the range and elevation of the target with respect to said impulse source means, and wherein said impulse source means and said impulse sensor means are carried by a hull.

9. A magnetic influence system according to claim 8, wherein said source coil has an inductance of less than 1000 µH.

10. A magnetic influence system according to claim 8, wherein said power source has a voltage greater than 100 Vdc.

11. A magnetic influence system according to claim 8, wherein the rise time of the current pulse in the source coil is less than 1 µS.

12. A magnetic influence system according to claim 8, wherein said impulsive magnetic field has a relative band width approaching 1.

13. A magnetic influence system according to claim 8, wherein said impulse sensor means includes a plurality of sensor coils distributed at various locations on the hull.

14. A self-contained magnetic influence system for an underwater weapon system, comprising:

a submerged hull having a non-conductive section;

a magnetic influence source coil carried by said non-conductive section for generating a broad-band impulsive magnetic dipole field in the vicinity of the underwater weapon;

a non-explosive high-energy power source within said hull adapted to provide a transient voltage pulse to said source coil, resulting in a rapid current pulse rise time in said source coil; and, a plurality of magnetic influence sensors distributed on said hull at the null points of said magnetic dipole field for detecting a returning scattered signal generated by a reflection of said broad-band magnetic dipole field off of a target, and wherein said returning scattered signal provides a bandwidth without side lobes for enhanced target detection.

15. A magnetic influence system according to claim 14, wherein said source coil has an inductance of less than 1000 µH.

16. A magnetic influence system according to claim 15, wherein said power source has a voltage greater than 100 Vdc.

17. A magnetic influence system according to claim 15, wherein the rise time of the current pulse in the source coil is less than 1 µS.

* * * * *